(12) United States Patent  
McRae

(10) Patent No.: US 10,200,416 B2  
(45) Date of Patent: Feb. 5, 2019

(54) GLOBAL SETTING FOR CASTING CONTENT TO NETWORKED RENDERER

(71) Applicant: Vizio Inc, Irvine, CA (US)

(72) Inventor: Matthew Blake McRae, Irvine, CA (US)

(73) Assignee: Vizio Inc, Irvine, CA (US)

( * ) Notice: Subject to any disclaimer, the term of this patent is extended or adjusted under 35 U.S.C. 154(b) by 728 days.

(21) Appl. No.: 14/630,296

(22) Filed: Feb. 24, 2015

(65) Prior Publication Data

US 2016/0255121 A1    Sep. 1, 2016

(51) Int. Cl.
| | |
|---|---|
| *H04L 12/24* | (2006.01) |
| *H04L 29/06* | (2006.01) |
| *H04L 12/46* | (2006.01) |
| *H04L 29/08* | (2006.01) |
| *H04N 21/436* | (2011.01) |

(52) U.S. Cl.
CPC ...... *H04L 65/1069* (2013.01); *H04L 12/4625* (2013.01); *H04L 41/509* (2013.01); *H04L 65/4084* (2013.01); *H04L 67/02* (2013.01); *H04N 21/43615* (2013.01)

(58) Field of Classification Search
CPC ......... H04N 21/43615; H04N 21/6125; H04N 21/47202; H04N 21/4782; H04L 41/509
See application file for complete search history.

(56) References Cited

U.S. PATENT DOCUMENTS

| 2002/0010756 A1* | 1/2002 | Oku | H04L 29/06 709/217 |
|---|---|---|---|
| 2010/0332565 A1* | 12/2010 | Al-Shaykh | G06F 17/30905 707/912 |
| 2011/0271275 A1* | 11/2011 | Ochi | G06F 8/63 717/177 |
| 2014/0282851 A1* | 9/2014 | Miller | H04W 4/21 726/1 |
| 2015/0381437 A1* | 12/2015 | Perez | G06F 3/02 709/219 |
| 2016/0088328 A1* | 3/2016 | McRae | H04N 21/43615 725/30 |
| 2016/0164932 A1* | 6/2016 | McRae | H04L 65/4069 709/231 |

(Continued)

*Primary Examiner* — Jeong S Park  
(74) *Attorney, Agent, or Firm* — Law Office of Scott C Harris, Inc

(57) ABSTRACT

A globally accessible list contains the identification of content casting applications, and the identification of stream receivers. When a casting application is launched to select a streaming content file, the casting application then accesses the global casting list and searches for the ID of the content casting application, and then selects the associated stream receiver to cast the URL to that stream receiver. This allows the user to not have to select the stream receiver every time a stream is cast. The list can be formed by an app, e.g., an application that forms the global list which may be an application that is provided with one of the stream receivers, for example. In one embodiment the list can be stored on a computer, e.g. the first computer that runs the application. The global casting list also contains, for each content casting application, an ordered list of IDs of user selected stream receivers by app and for by user. A stream receiver is selected based on order of the list.

12 Claims, 13 Drawing Sheets

(56) References Cited

U.S. PATENT DOCUMENTS

2016/0182585 A1* 6/2016 McRae ............ H04N 21/42684
709/219
2017/0223128 A1* 8/2017 Shuvaev ................. H04W 4/70

* cited by examiner

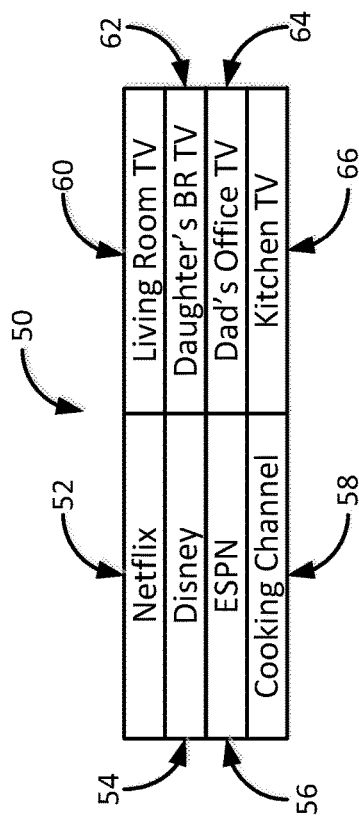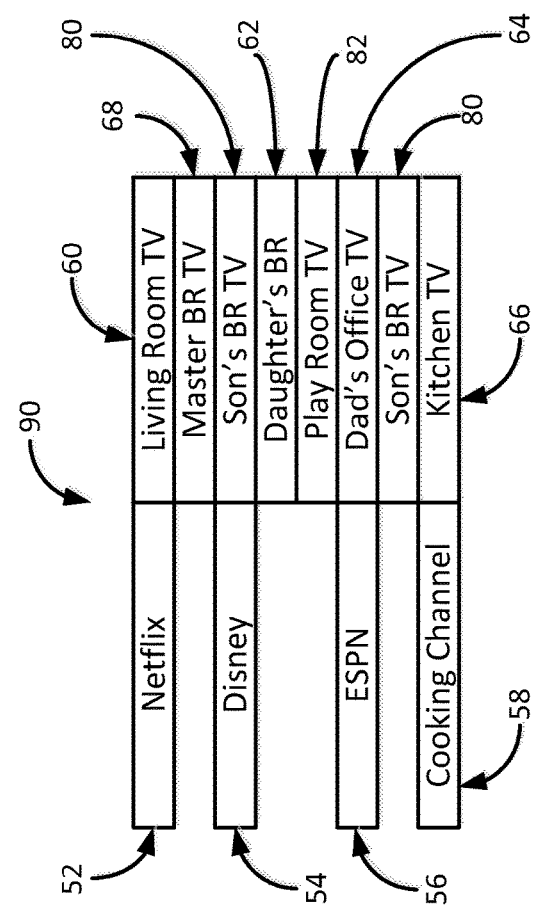

GLOBAL SETTING FOR CASTING CONTENT TO NETWORKED RENDERER

BACKGROUND

The introduction of "casting" applications such as Google's Chromecast enabled applications that select content streams and stream receivers now make it possible to select multimedia content hosted on intranets and the internet and to direct the content stream to any display device that hosts a stream receiver or has a stream receiving device, such as Google Chromecast, attached to the display device.

Casting applications facilitate the selection of content by the user being able to use a laptop computer, desktop computer, tablet computer, PDA, or cell phone to select multimedia content on network based service providers such as Netflix, Amazon, Hulu, Pandora, or other such services. Once a user selects a casting application for accessing content, that user can select streaming content and then redirect the content stream by selecting a stream receiver to actually play the content stream. The user presses the play button and the casting application will "cast" the stream to the selected stream receiver.

A typical household environment or a business environment may contain multiple stream receivers and multiple content casting or content stream redirection applications. An environment with both multiple casting/redirect applications and multiple stream receivers can quickly become confusing as to which casting/redirect application will make use of which stream receiver.

Google cast and other streaming schemes force the user to select the stream receiver device in every content casting application separately and each time a stream is to cast on any given content casting application. This can become confusing with which content casting application is streaming to which stream receiver.

As an example, today if one were to launch the Netflix content casting application and cast the stream to a stream receiving device, then launch the YouTube content casting application, one will again have to select the stream receiver device to receive the YouTube content.

SUMMARY

The inventor recognized the need for some way to associate multiple content casting applications that connect to multiple streaming content providers to be associated with multiple user selected stream receivers such that selection of an application would automatically redirect the program content stream to the preselected associated stream receiver.

Embodiments described herein define a system wide globally accessible list enabling a user to associate content casting applications residing on one or more client devices to selected stream receivers.

As an example, a user could select the Netflix content casting application and associate "Living Room TV" with that content streaming application and next select the YouTube content casting application and then select "Master Bed Room TV" with that content casting application. In this example, the Netflix content casting application will always cast content to the "Living Room TV" and the YouTube content casting application will always cast content to the "Master Bed Room TV".

BRIEF DESCRIPTION OF THE DRAWINGS

In the drawings:

FIG. 3 is a depiction of a globally accessible list containing the identification of each content casting application contained on a client computing device and the associated stream receiver for each content casting application.

FIG. 4 is a depiction of a globally accessible list containing ordered list of stream receivers for use by each casting application contained on a client device. The casting application will automatically cast a stream to the first available stream receiver for a given content casting application.

DETAILED DESCRIPTION

Figure 1:
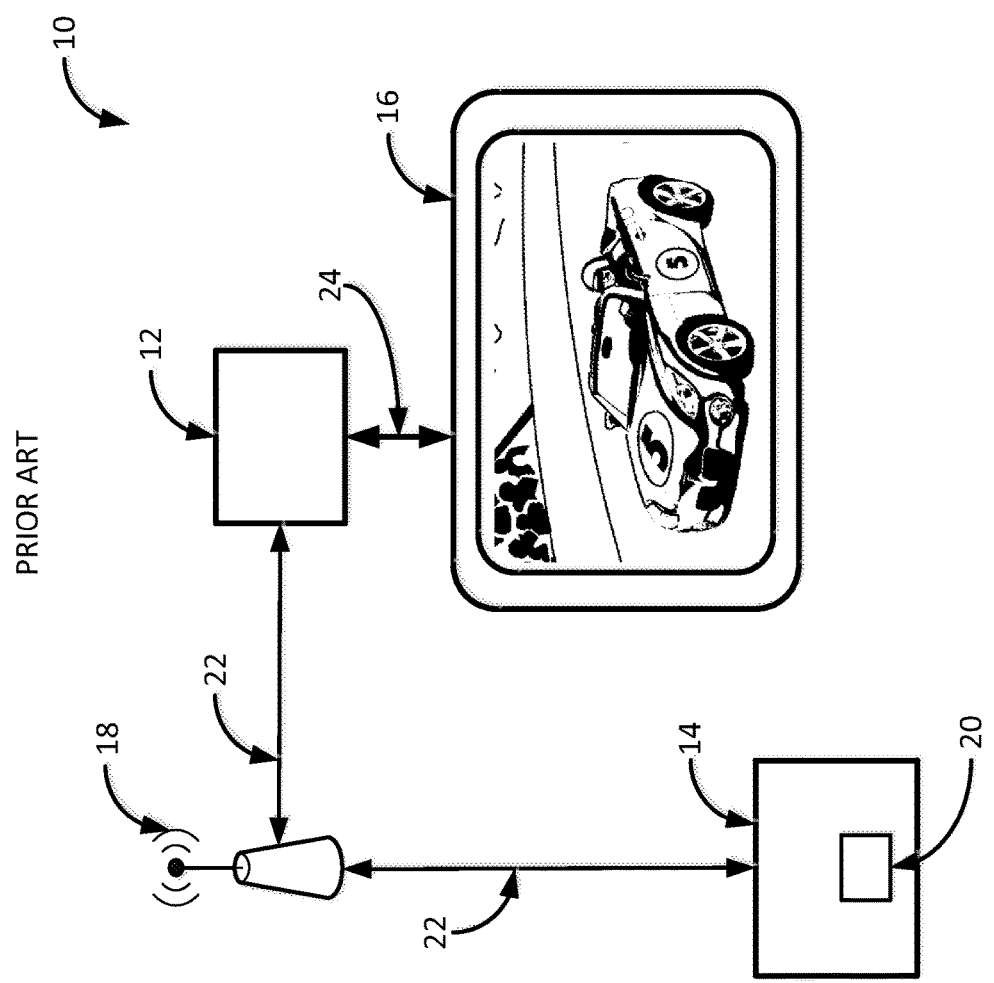
FIG. 1 is a prior art schematic depiction of the devices in a stream casting environment.

In a preferred embodiment, a globally accessible list contains the identification of content casting applications residing on the same client device and the identification of stream receivers residing on the same wired or wireless network as the client device. In this embodiment, the user launches a casting application and then selects a streaming content file. The casting application then accesses the global casting list and searches for the ID of the content casting application, and then selects the associated stream receiver to cast the URL to that stream receiver. This embodiment allows the user to not have to select the stream receiver every time a stream is cast.

The list can be formed, for example, by an app, e.g., an application that forms the global list which may be an application that is provided with one of the stream receivers. In one embodiment the list can be stored on a computer, e.g. the first computer that runs the application. In another embodiment, the list can be stored on a globally accessible Internet site, or on a storage device accessible on a local network such as Wifi.

In another preferred embodiment, the global casting list contains information that identifies the content casting applications residing on the same client device and/or on other client devices. The global casting list also contains, for each content casting application, an ordered list of IDs of user selected stream receivers. In this embodiment, the casting application accesses the global casting list, searches for its ID and then casts the URL to the first stream receiver in the ordered list. If that stream receiver is busy or not ready, it will refuse the casted stream by either timing out the request or by notifying the casting application. In this embodiment, the casting application will cast the content or URL to the next stream receiver in the ordered list. This loop will continue until one of the stream receivers in the ordered list accepts the casted content or URL or the ordered list is exhausted. The user will be notified if no receiver can accept the casted information. This testing of receivers allows the list to be used in multiple different environments, e.g. where certain receivers may or may not be located and certain receivers may or may not be powered on.

Note the above refers to casting URLs, but other information indicative of the content can also be sent such as photographs, video, audio (music), documents, or other data whose location can be identified by a URL.

In another preferred embodiment, the global casting list entries contain the name of at least one user, the ID of at least one content casting application residing on the client device, and the ID of at least one stream receiver. In this embodiment the user first launches the content casting application. The users identify themselves from a list containing at least one user. The user then selects a content program and the content casting application automatically casts the content stream to the stream receiver associated with the current user and current content casting application.

In another preferred embodiment, the content casting application operates, after casting a first content stream to a preselected stream receiver, to cast a second stream to a second stream receiver. In this embodiment, the stream receivers are controlled by a second remote control device and not the content streaming application from which the stream was cast. The second device may be any device capable of communicating over a wireless network and communicating with the stream receiver.

Now referencing prior art FIG. 1 where 10 is a depiction of a stream casting application 20 that resides and executes on tablet computer 14. This figure depicts the interaction between stream casting application 20 and stream receiver 12 that renders streams on television 16. Stream casting application could also execute on a desktop or laptop computer, Smart Phone, or a PDA.

In the present embodiment, content casting application 20 accesses a web site such as Netflix® and displays a catalog of program content files. Stream casting application 20 accesses the web site of a single content provider through tablet computer 14 having access to the internet through communications link 22 and Wifi access point 18. Wifi access point 18 also has a communications link 22 to stream receiver 12. Tablet computer 14 and stream casting application 20 can communicate with stream receiver 12 via communications links 22 and Wifi access point 18.

In this prior art depiction, the user will launch stream casting application 20 residing on tablet computer 14. Stream casting application will access, for example, the Netflix web site, and will display a catalog of program content. The user will select one of the programs and then will press "PLAY ON" button 38 shown in FIG. 2. The user will then select a stream receiver from a list of stream receivers (40, 42, and 44 shown in FIG. 2) shown on the user interface of stream casting application. Once the user selects the stream receiver 12, for example, stream casting application 20 will send the necessary information relating to the selected stream to stream receiver 12. Stream receiver 12 will, after receiving the stream info, contact the program content provider and start receiving the stream via communications link 22 and Wifi access point 18. As the stream is received by stream receiver 12, the stream will be decoded and rendered on television 16.

Figure 2:
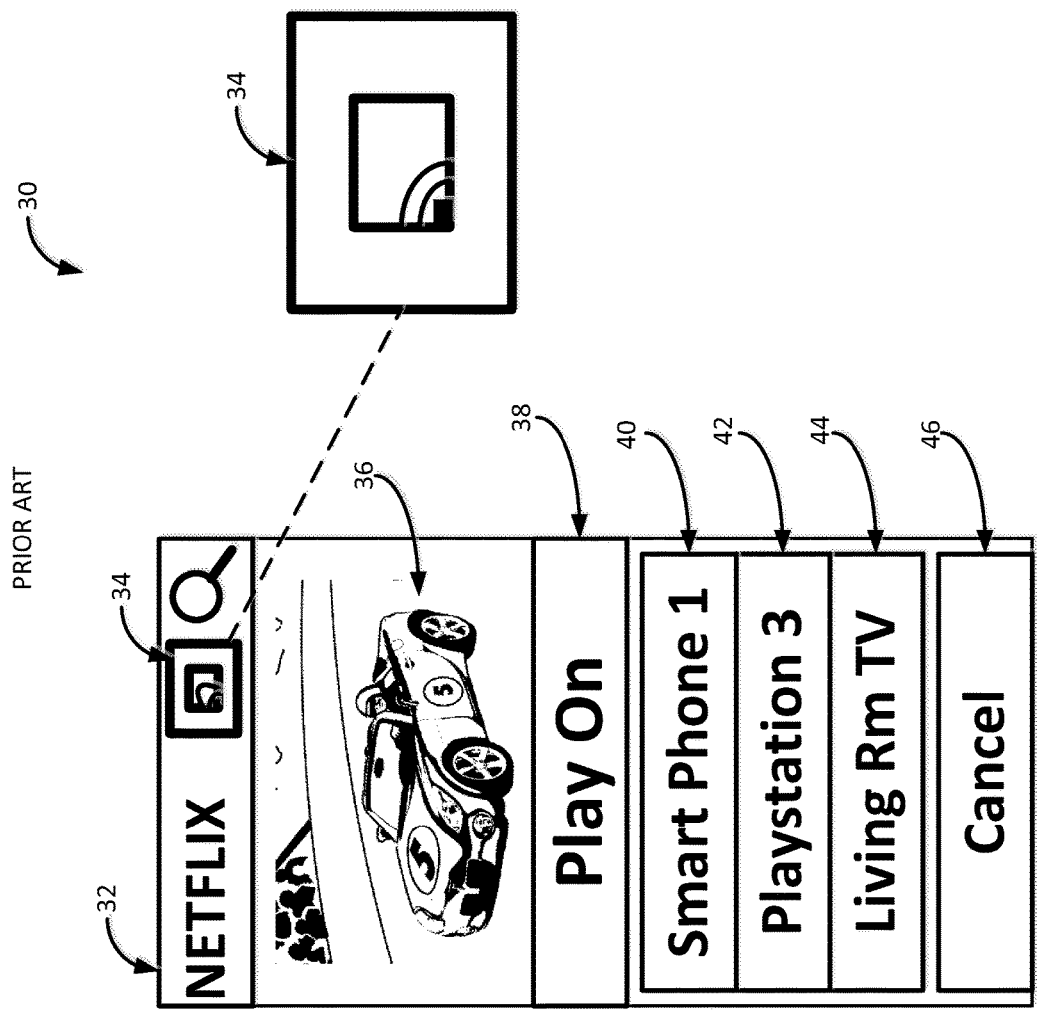
FIG. 2 is a prior art depiction of a stream casting application for NetFlix showing that the user has selected a content file and that the application has detected 3 stream receivers, any of which can be selected for receiving the selected content stream.

Now referencing prior art FIG. 2. This depiction is a line art rendering of stream casting application 20 as used by Netflix. Note that casting icon 32 is present on any stream casting application and identifies the application as stream casting capable.

In this depiction, display window 36 depicts a frame of the video stream or a poster of the program content that will be cast to stream receiver 12 of FIG. 1. Buttons 40, 42, and 46 depict the names of three stream cast receivers detected via Wifi access point 18 FIG. 1. In this prior art depiction, the user will launch stream casting application 18 of FIG. 1 which will access the Netflix® web site and gather a portion of the Netflix® catalog and display that portion on display window 36. Once a content file is selected, a frame of the video stream or a program poster will be rendered in window 36. The user will next press "Play On" button 38 and then press one of the stream receiver buttons (40, 42, 44) selecting the stream receiver that will receive the necessary information allowing it to initiate and receive the content stream. Stream receiver 12 will then receive and decode the video stream and render the stream on television 16.

Now referencing FIG. 3 where 50 depicts an embodiment of the invention where a globally accessible list contains the IDs of stream receivers associated with content casting applications. In this depiction, content casting applications that are shown include 52 Netflix, 54 Disney, 56 ESPN, and 58 Cooking Channel. For each listed content casting application, the ID of an associated stream receiver is listed. In this embodiment, Netflix 52 content casting application will automatically default to cast streams to living room TV 60, Disney 54 will automatically default to cast streams to Daughter's BR TV 62. This association between content casting applications and stream receivers relieves the user of the task of always having to select a stream receiver for each stream that he casts.

Now referencing FIG. 4 where 90 depicts an ordered list containing the names of a plurality of stream receivers ordered by preference for each content casting application. In this embodiment, stream casting application 52 operates, after the user has selected a program content stream, to automatically search ordered list 90 based on the ID of the content casting application. Stream casting application 154 in drawings 6, 8, 9, and 10 begins by requesting status from the first entry in ordered list 90. Content casting application 154 automatically sends the stream info to the first stream receiver associated with the content casting application that returns a status of READY. This embodiment not only relieves the user of having to select a stream receiver from a possible plurality of stream receivers, it also send the stream to the first stream receiver that is not busy, or the first that is turned on and ready. In FIG. 4, globally accessible list 90 is first ordered by content casting applications.

Figure 5:
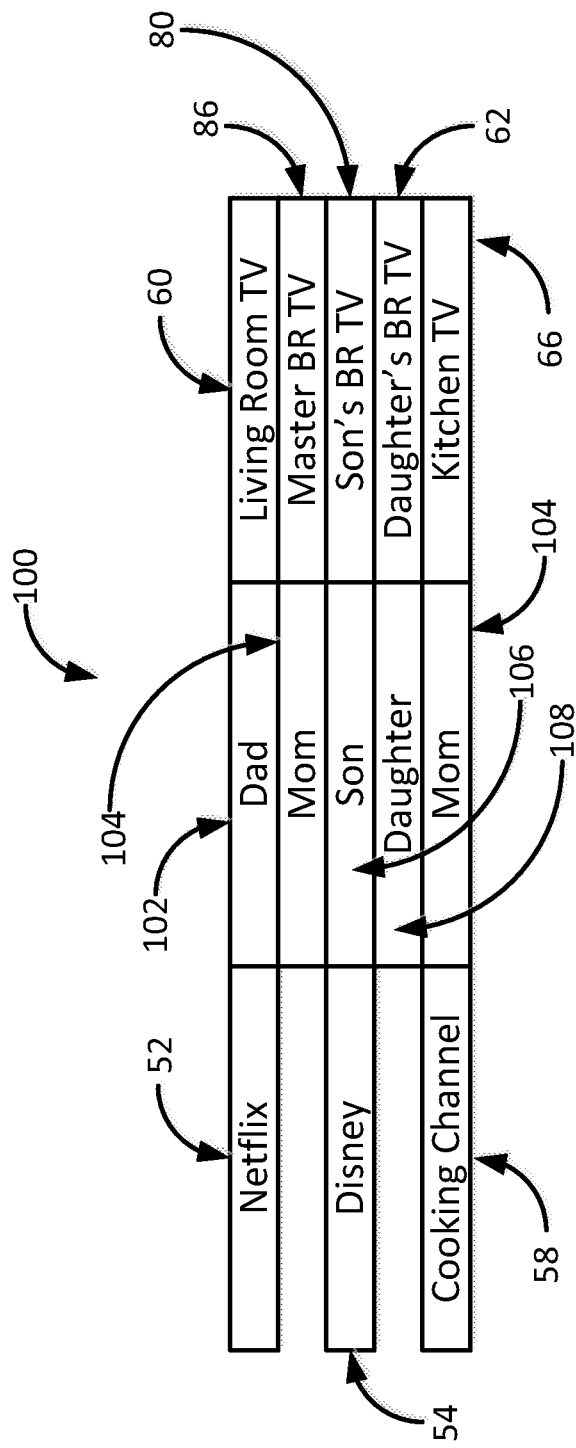
FIG. 5 is a depiction of a globally accessible list containing, for each content casting device contained on a client device, the identification of a user and the associated stream receiving device for that user.

Now referencing FIG. 5 where 100 depicts a globally accessible ordered list where multiple people may have access to multiple content casting applications that may cast to multiple stream receivers. For example, in this depiction, users Dad 102 and Mom 104 both use the Netflix content casting application 52. Netflix application 52 casts to living room TV 60 when Dad 102 is using the application. The same holds true for Disney content casting application 54 when used by either Son 106 which casts to Son's BR TV 80 or Daughter 108 which casts to Daughter's BR TV 62. Cooking Channel 58 content casting application only has one user who is Mom 104 which casts to Kitchen TV 66. More generally, this arranges the receiver based on the user that invokes the content casting app.

Figure 6:
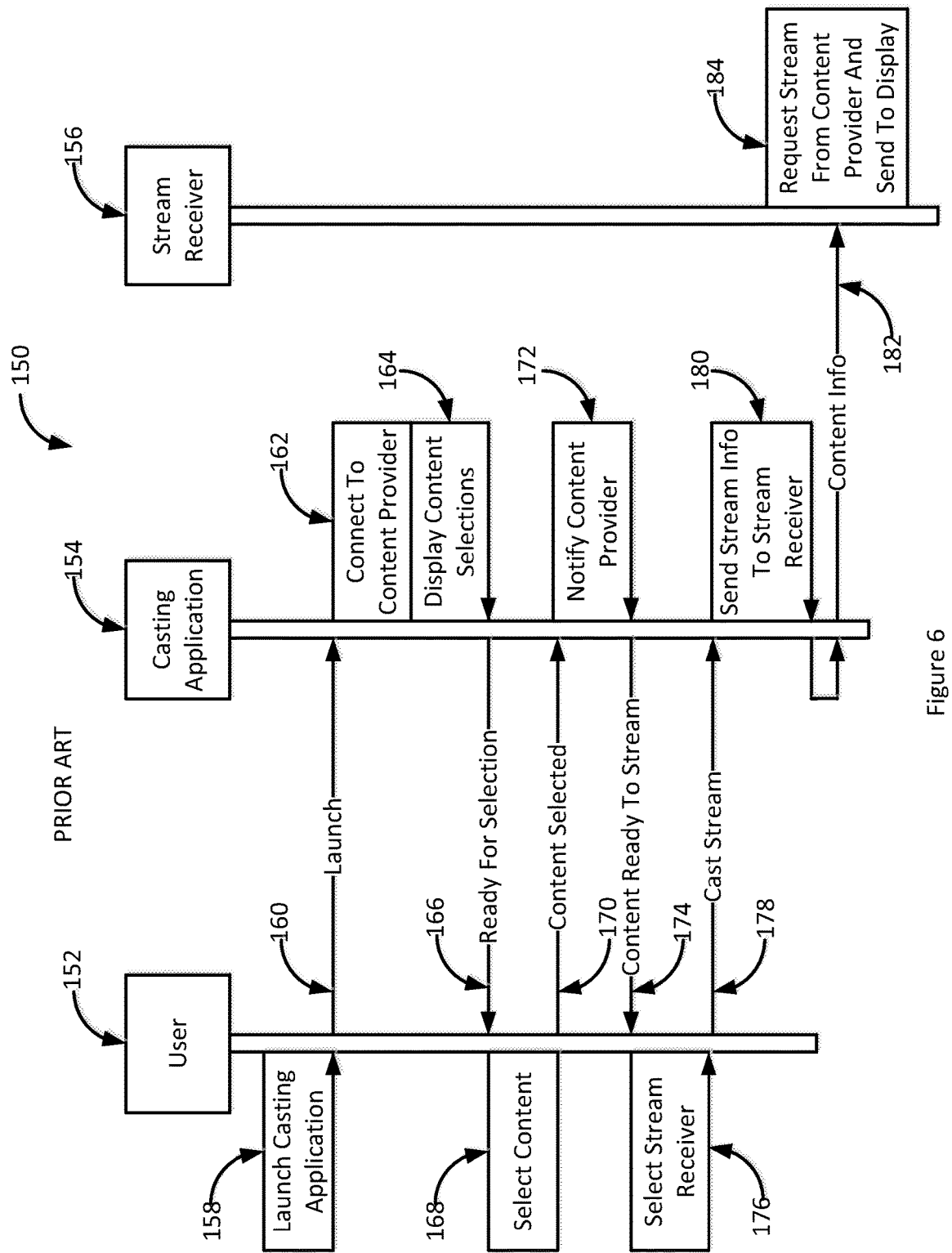
FIG. 6 is a prior art depiction of the logic flow for a standard content casting application that allows the user to select content then to select a stream receiver to receive the content casted to it by the content casting application.

Now referencing prior art FIG. 6 where 150 depicts the logic flow of a prior art standard stream casting application. Depicted in this figure is the user 152, casting application 154, and the stream receiver 156. The process begins with user 152 at logic block 158 launch casting application. The user's actions results in casting application 154 launching and starting at logic block 162 to connect to content provider. This logic block connects via a network to the content provider's web site. Once the connection is made, control falls through to logic block 164 display content selections. This logic block accesses a portion of the content catalog from the content provider and displays it in display window 36 FIG. 2 and sends notification 166 ready for selection to user 152. At this point, user 152 selects content 168 and sends content selected 170 to casting application 154 at Logic block 172 notify content provider. This logic block sends information to the content provider that a selected program content will be streamed. Logic block 172 notify content provider sends content ready to stream 174 to user 152 at logic block 176 select stream receiver. At this point, user 152 at logic block 176 selects stream receiver, will press the "Play On" button 38 FIG. 2. Stream casting application 154 displays a list of all stream receivers detected on local Wifi access point 18 FIG. 1. Once user 152 selects a stream receiver, casting application 154 is notified by signal cast stream 178 being received by casting application 154 at logic block 180 send stream info to stream receiver. This logic block sends signal content info 182 to stream receiver 156 at logic block 184 request stream from content provider and send to display 16 FIG. 1. This logic notifies the content provider's web site to start the stream whose info was sent to the web site at logic block 172 notify content provider. As the stream is received logic block 184 of stream receiver 156 decodes and renders the stream on display 16 FIG. 1.

Figure 7:
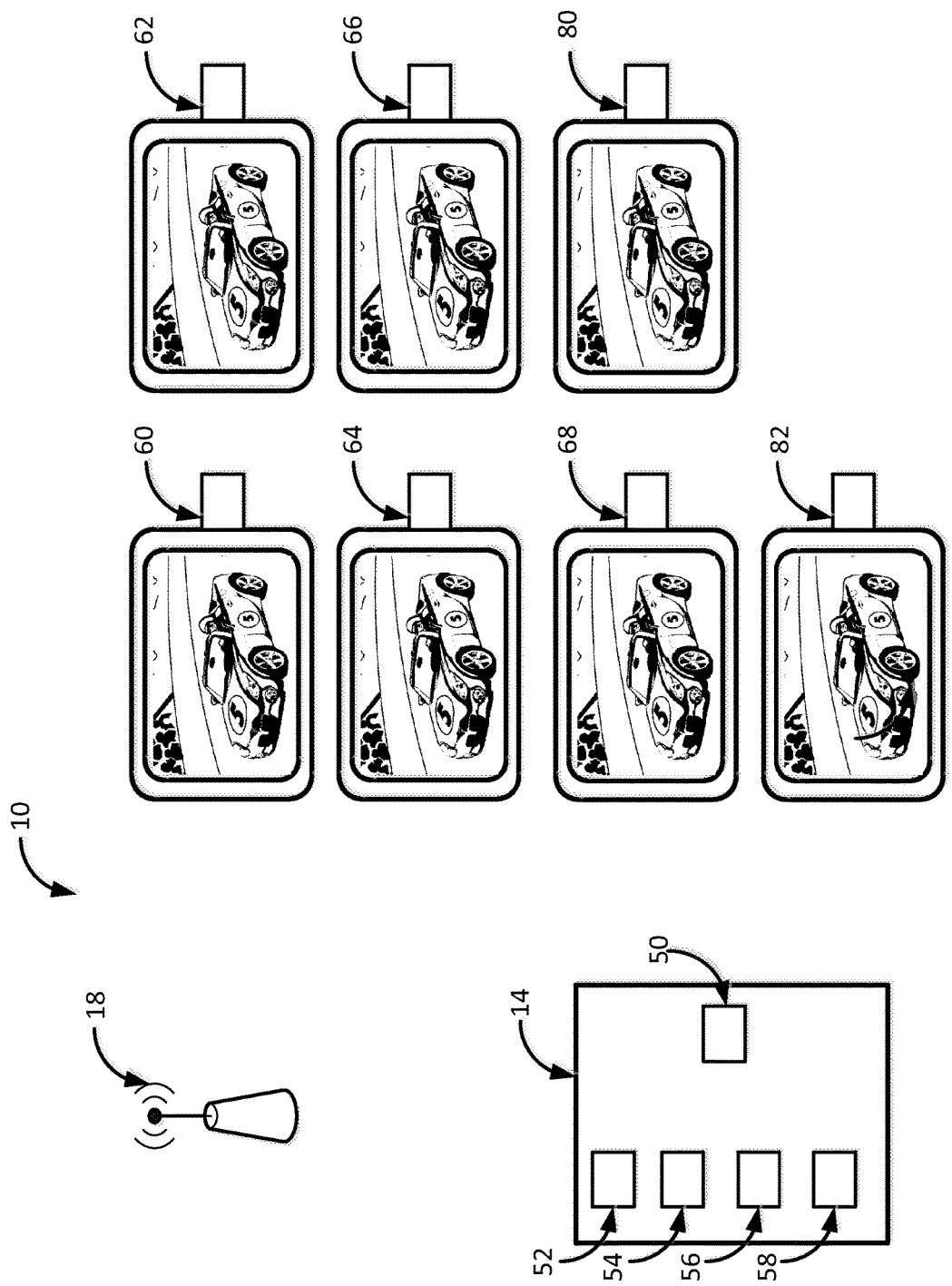
FIG. 7 is depiction of a residence with seven televisions, each with a stream receiver connected, and a computing device with four content casting applications and a globally accessible list that associates content casting applications and stream receivers and users with each other.

Now referencing FIG. 7 where 200 depicts a residence with seven televisions, each with an attached stream receiver. The television/stream receiver identification and location is shown in Table 1 below.

TABLE 1

Television/Stream Receiver Identification

| Stream ID | Location |
| --- | --- |
| 60 | Living room TV |
| 62 | Daughter's BR TV |
| 64 | Dad's Office |
| 66 | Kitchen TV |
| 68 | Master BR TV |
| 80 | Son's BR TV |
| 82 | Playroom TV |

In this depiction, Wifi access point 18 provides wireless connectivity to all seven of the stream receivers/televisions (60-82) and to tablet computer 14 executing content casting applications 52 Netflix, 54 Disney, 56 ESPN, and Cooking Channel 58. Wifi access point 18 also provides wireless connectivity for tablet computer 14. Tablet computer 14 also contains global television/stream receiver in table 1 above. This globally accessible list allows content casting applications to know which stream receiver they are defaulted to for connections.

Figure 8:
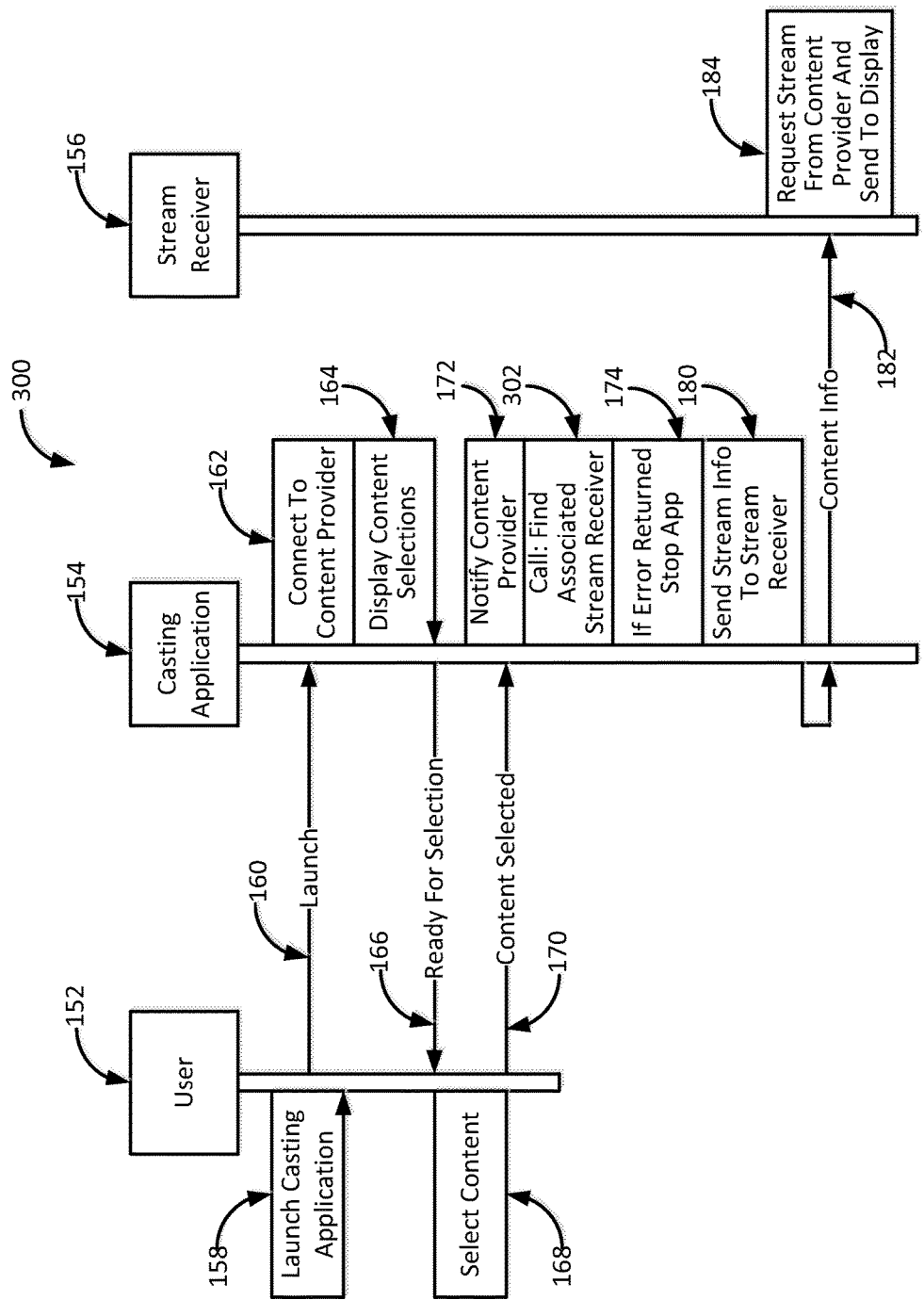
FIG. 8 is a logic flow depiction of embodiment 1 of the invention where the content casting application will search the globally accessible list for its own ID then for the associated stream receiver Id.

Now referencing FIG. 8 where 300 is a logic flow diagram depicting embodiment 1 of the invention. Depicted in this figure are user 152, casting application 154, and stream receiver 156. The process begins with user 152 at logic block 158 launch casting application. The user's actions results in casting application 154 receiving signal 160, launch, starting at logic block 162 to connect to content provider. This logic block connects via a network to the content provider's web site. Once the connection is made, control falls through to logic block 164 display content selections. This logic block accesses a portion of the content catalog from the content provider and displays it in display window 36 FIG. 2 and sends notification 166 ready for selection to user 152. At this point, user 152 performs select content 168 and sends signal content selected 170 to casting application 154 at Logic block 172 to notify content provider. This logic block sends information to the content provider that a selected program content will be streamed. Control then falls through to logic block 302 call: find associated stream receiver. This logic block makes a call to function 322 find associated stream receiver. This function searches for casting application 154 in globally accessible list 50 (FIG. 3). If the ID for casting application 154 is not found in the list, the function (322) notifies the user and returns an error to the caller. If casting application 154 is found in globally accessible list 50, the function will then see if the associated stream receiver is visible over the wireless network. If the function cannot see the associated stream receiver, it notifies the user and then returns an error to the caller. If the stream receiver is visible, the function will return the stream receiver's ID to the caller. If the function returns an error to logic block 302, control falls through to logic block 174 if error returned stop app, which will effectively stop the application. If decision logic block 174 determined that a stream receiver ID was returned, control is transferred to logic block 180 send stream info to stream receiver. This results in content info 182 being sent over the network to stream receiver 156 at logic block 184 request stream from content provider and send to display. At this point stream receiver 156 will continually receive the content stream, decode the stream, and send it to the associated television.

Figure 8A:
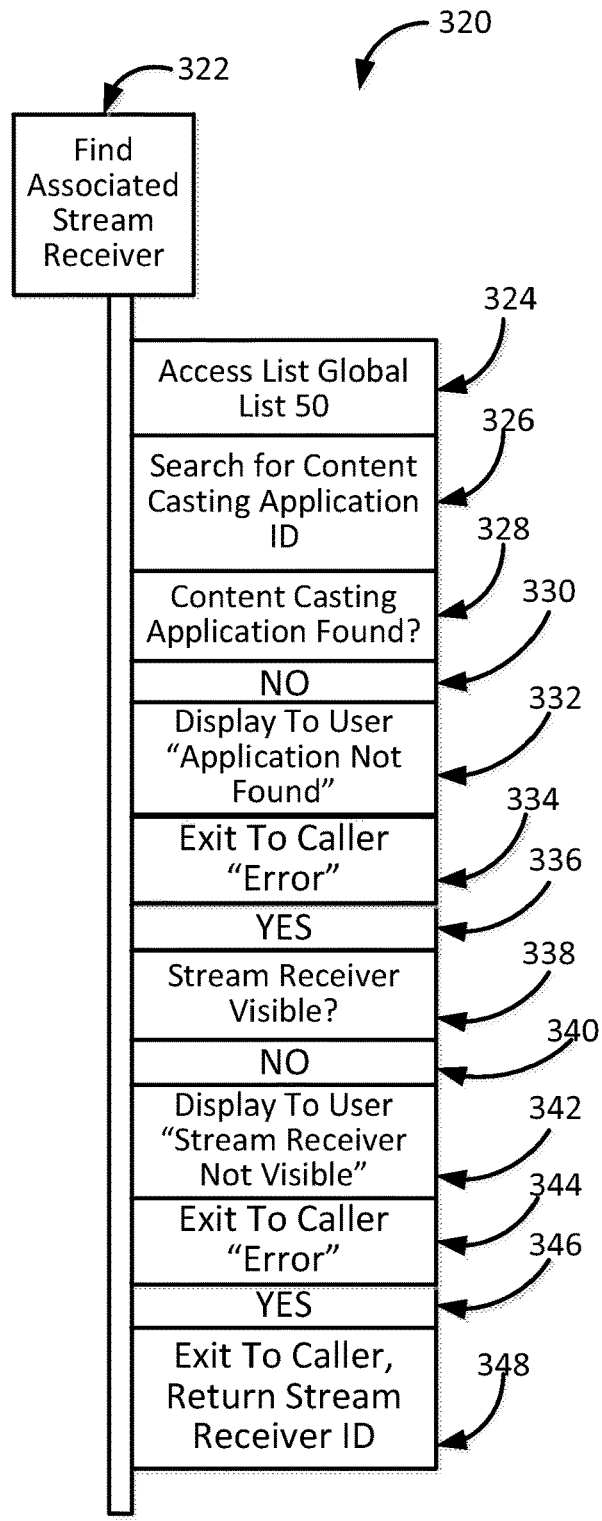
FIG. 8A is a logic flow depiction of logic block 302 of FIG. 8.

Now referencing FIG. 8A which is a depiction of function: find associated stream receiver 320. Entry to the function is at logic block 322 find associated stream where control falls through to logic block 324 access global list 50 (FIG. 3). Global list 50 contains the IDs of all casting applications 154 as depicted in FIG. 8. Global list 50 contains, for each casting application, one associated stream receiver ID.

At this point control falls through to logic block 326 search for content casting application ID, after which, control falls through to decision logic block 328 content casting application found? If the ID for casting application 154 cannot be found, control falls through to result block 330 NO then to logic block 332 display to user "Application Not Found" after which control falls through to return logic block 334 exit to caller "Error".

If the ID for casting application 154 was found at decision logic block 328, control is transferred to result block 336 YES after which control falls through to logic block 338 stream receiver visible? If the stream receiver is not visible, control falls through to results block 340 NO then to logic block 342 display to user "Stream Receiver Not Visible" after which control falls through to return logic block 344 exit to caller "Error". If the stream receiver ID was visible on the network, control will transfer to result block 346 YES after which control falls through to return block 348 exit to caller, return stream receiver ID.

Figure 9:
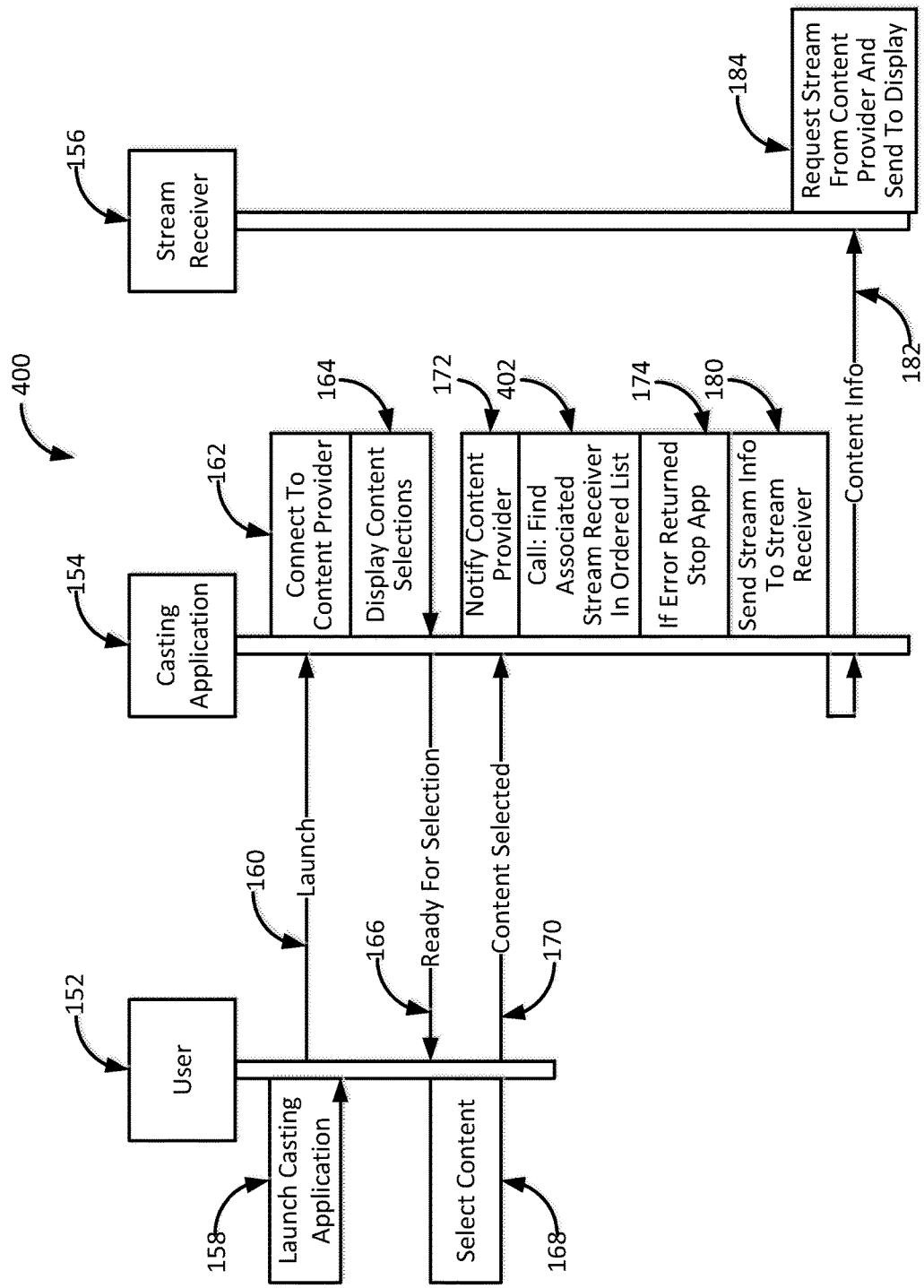
FIG. 9 is a logic flow depiction of embodiment 2 of the invention where the content casting application will search the globally accessible list for its own ID then for one of a plurality of the associated stream receiver IDs.

Now referencing FIG. 9 where 400 is a logic flow diagram depicting embodiment 2 of the invention. Depicted in this figure are user 152, casting application 154, and stream receiver 156. The process begins with user 152 at logic block 158 launch casting application. The user's actions results in casting application 154 receiving signal 160 launch, starting at logic block 162 to connect to content provider. This logic block connects via a network to the content provider's web site. Once the connection is made, control falls through to logic block 164 display content selections. This logic block accesses a portion of the content catalog from the content provider and displays it in display window 36 FIG. 2 and sends notification 166 ready for selection to user 152. At this point, user 152 performs select content 168 and sends signal content selected 170 to casting application 154 at Logic block 172 notify content provider. This logic block sends information to the content provider that a selected program content will be streamed.

Control then falls through to logic block 402 call: find associated stream receiver in ordered list. This logic block makes a call to function 422 to find associated stream receiver in ordered list. This function first searches for casting application 154 in globally accessible list 90 (FIG. 4). If the ID for casting application 154 is not found in the list, the function (422) notifies the user and return an error to the caller. If casting application 154 is found in globally accessible list 90, the function will then scan the ordered part of the stream receiver list which in this embodiment for casting application for Netflix will include two stream receivers, those being 60 living room TV and 68 master BR TV. If the function cannot see either of the associated stream receivers, it will notify the user and then return an error to the caller. If at least one of the stream receivers is visible, the function will return the first visible stream receiver's ID to the caller. If the function returned an error to logic block 402, control falls through to logic block 174 if error returned, stop app which effectively stops the application. If decision logic block 402 determines that a stream receiver ID was returned, control is transferred to logic block 180 send stream info to stream receiver. This results in content info 182 being sent over the network to stream receiver 156 at logic block 184 request stream from content provider and send to display. At this point stream receiver 156 continually receives the content stream, decodes the stream, and sends it to the television.

Figure 9A:
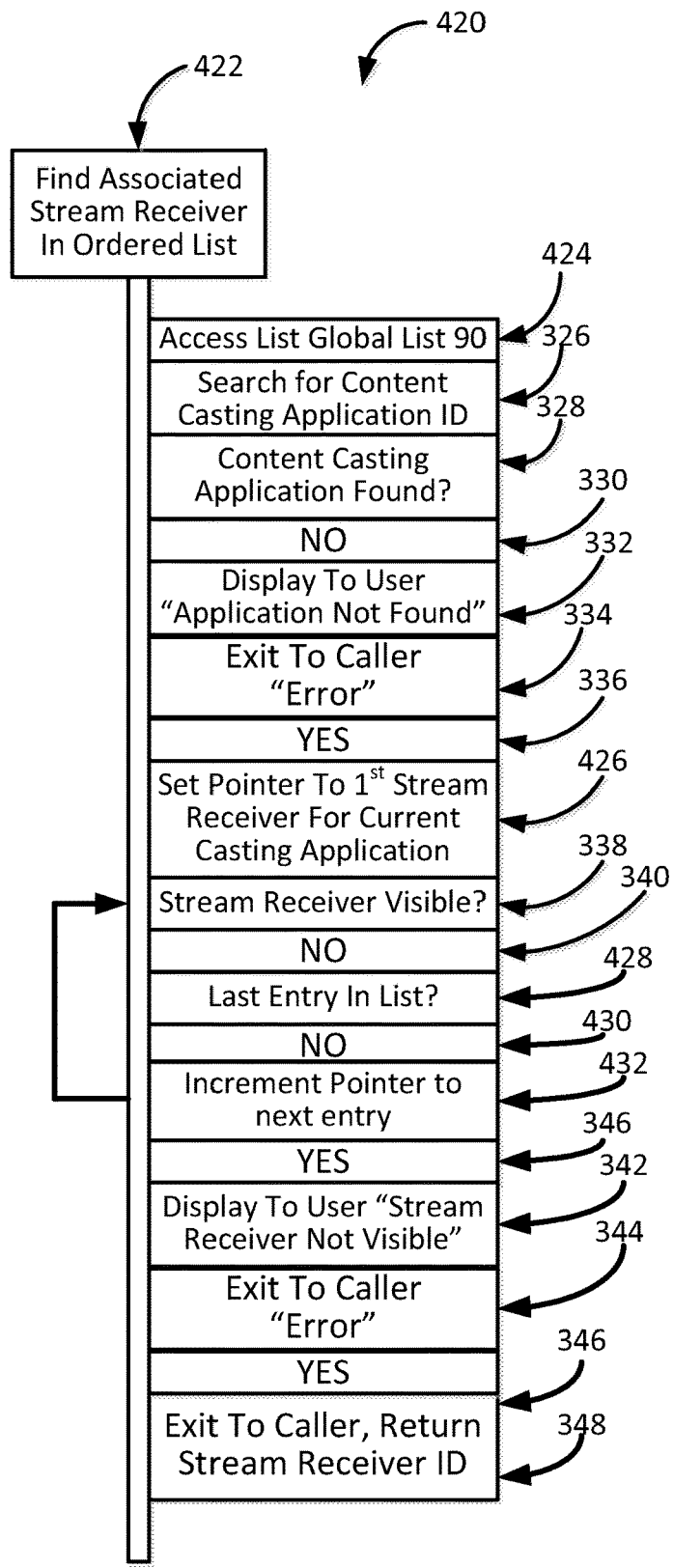
FIG. 9A is a logic flow depiction of logic block 402 of FIG. 9.

Now referencing FIG. 9A which is a depiction of function: find associated stream receiver in ordered list 420. Entry to the function is at logic block 422 find associated stream receiver in ordered list were control falls through to logic block 424 access global list 90 (FIG. 4). Global list 90 has the IDs of all casting applications 154 as depicted in FIG. 9. Global list 90 contains, for each casting application, one or more associated stream receiver IDs. At this point control will fall through to logic block 326 search for content casting application ID after which control will fall through to decision logic block 328 content casting application found? If the ID for the casting application making the call to function 422 cannot be found then control will fall through to result block 330 NO then to logic block 332 display to user "Application Not Found" after which control will fall through to return logic block 334 exit to caller "Error". If the ID for the current content casting application was found at decision logic block 328 control will be transferred to result block 336 YES after which control will fall through to logic block 426 set pointer to first stream receiver for current casting application. This logic block sets up an index pointer into the ordered list of stream receivers associated with the current casting application. Control then falls through to decision logic block 338 stream receiver visible? If the stream receiver is not visible, control falls through to results block 340 after which control falls through to decision block 428 last entry in list? If the currently indexed stream receiver was not the last indexed stream receiver ID in the list, control falls through to logic block 432 increment pointer to next entry after which control is transferred to the top of the loop, decision block 338 stream receiver visible? Decision logic block 338 attempts to see if the ID for the currently indexed stream receiver ID is visible on the wireless network. If the stream receiver ID is visible on the network, control transfers to result block 346 YES after which control will fall through to return block 348 exit to caller, return stream receiver ID. If decision logic block 428 last entry in list? Determined that the currently indexed stream receiver was the last stream receiver ID in the ordered list, control will transfer to results block 346 YES after which control will fall through to display logic block 342 display to user "Stream Receiver Not Visible" after which control will fall through to return block 344 exit to caller "Error".

Figure 10:
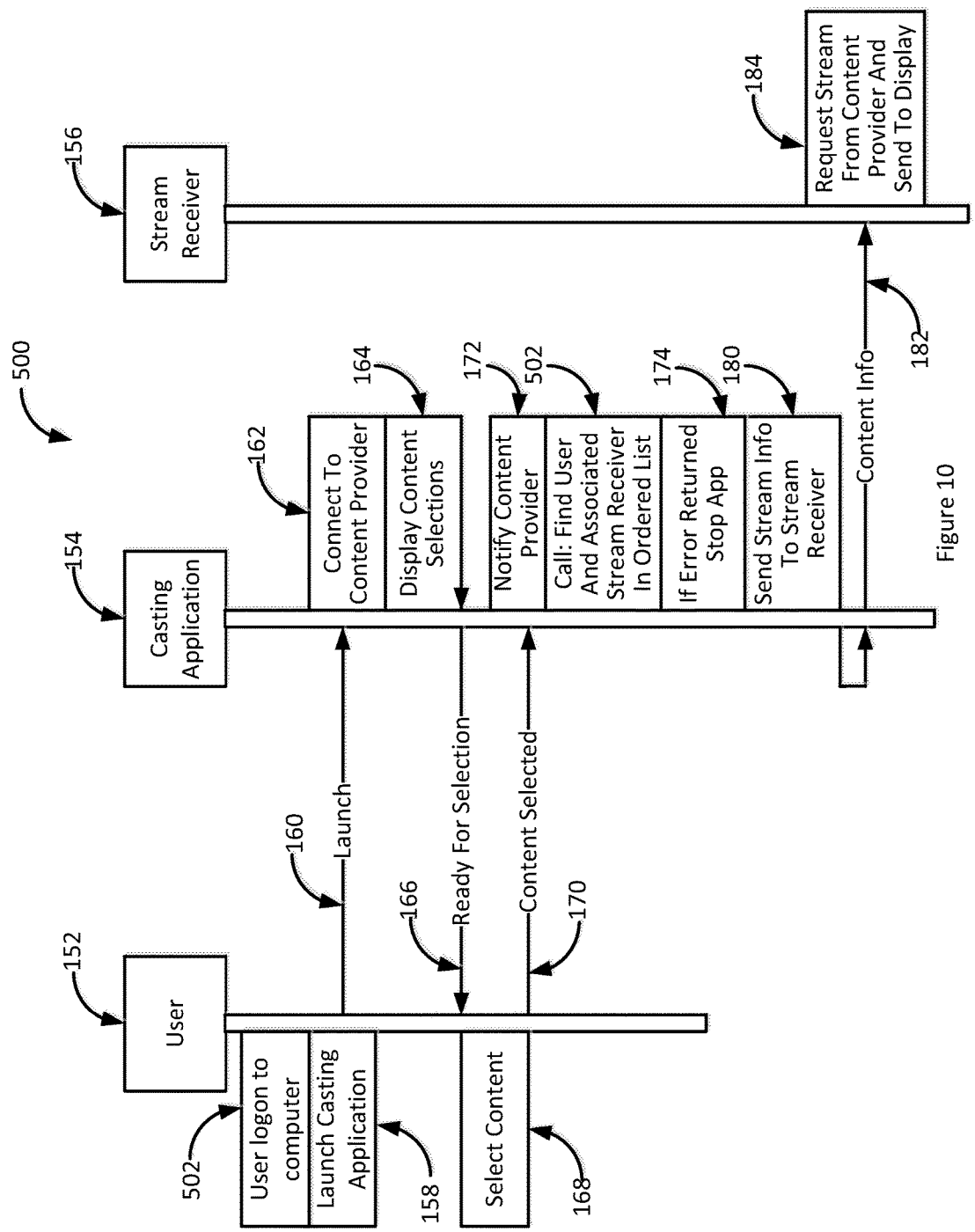
FIG. 10 is a logic flow depiction of embodiment 3 of the invention where the content casting application will search the globally accessible list for its own ID then for the ID of the user currently logon onto the computer then for the stream receiver ID associated with the current user.

Now referencing FIG. 10 where 500 is a logic flow diagram depicting embodiment 3 of the invention. Depicted in this figure are user 152, casting application 154, and stream receiver 156. The process begins with user 152 at logic block 158 launch casting application. The user's actions results in casting application 154 receiving signal 160 launch, starting at logic block 162 connect to content provider. This logic block connects via a network to the content provider's web site. Once the connection is made, control falls through to logic block 164 display content selections. This logic block accesses a portion of the content catalog from the content provider and displays it in display window 36 FIG. 2 and sends notification 166 ready for selection to user 152. At this point, user 152 will perform select content 168 and sends signal content selected 170 to casting application 154 at Logic block 172 notify content provider. This logic block sends information to the content provider that a selected program content is being streamed.

Control will then fall through to logic block 502 call: find user and associated stream receiver in ordered list. This logic block makes a call to function 522 find user and associated stream receiver in ordered list. This function first searches for casting application 154 in globally accessible list 100 (FIG. 5). If the ID for casting application 154 is not found in the list, function 522 notifies the user and returns an error to the caller. If the ID for casting application 154 is found in globally accessible list 100, function 522 will scan the ordered part of the list for the casting application for the user ID currently logged onto computer 14. In this embodiment, the casting application for Netflix 52 is two users, Dad 102 and Mom 104, each of whom has an associated stream receiver. Dad 102 is associated with stream receiver 60 living room TV and Mom 104 is associated with stream receiver 86 master BR TV. If Dad 102 or Mom 104 is not the current user logged onto computer 14, function 522 will display "User Currently Logged On Not Found In List" and will then return "Error" to calling function 502 after which control will fall through to logic block 174 if error returned stop app. If the current user logged onto computer 14 is found in the list for the current casting application, function 522 will then see if the user's associated stream receiver is visible on the wireless network. If the associated stream receiver is visible, function 522 returns the stream receiver's ID to the caller. If function 522 returned an error to logic block 502, control will fall through to decision logic block 174 if error returned, stop app which will effectively stop the application. If decision logic block 174 determined that a stream receiver ID was return, control is transferred to logic block 180 send stream info to stream receiver. This results in content info 182 being sent over the network to stream receiver 156 at logic block 184 request stream from content provider and send to display. At this point stream receiver 156 is receiving the content.

Figure 10A:
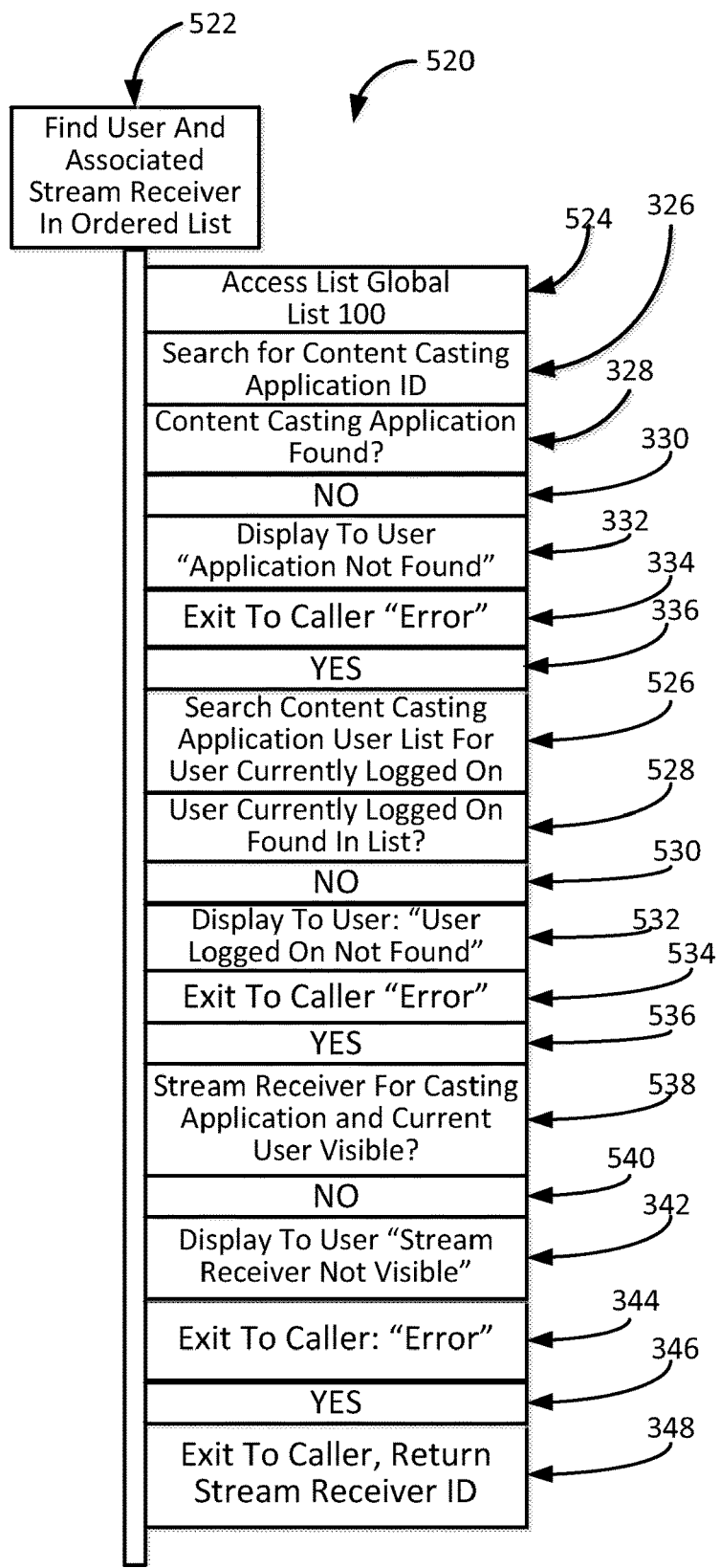
FIG. 10A is a logic flow depiction of logic block 502 of FIG. 10.

Now referencing FIG. 10A which is a depiction of function: find user and associated stream receiver in ordered list 520. Entry to the function is at logic block 522 find user and associated stream receiver in ordered list were control falls through to logic block 524 access global list 100 (FIG. 5). Global list 100 (FIG. 5) contains the IDs of all casting applications 154 and the IDs of each user 152 as depicted in FIG. 10. Global list 100 contains, for each casting application, one or more user IDs and the associated stream receiver ID for each user. At this point control will fall through to logic block 326 search for content casting application ID after which control will fall through to decision logic block 328 content casting application found?

If the ID for casting application 154 cannot be found, then control falls through to result block 330 NO then to logic block 332 display to user "Application Not Found" after which control will fall through to return logic block 334 exit to caller "Error".

If the ID for the current content casting application was found, decision logic block 328 will transfer control to result block 336 YES after which control will fall through to logic block 526 search content casting application user list for user currently logged on.

Control will then fall through to decision logic block 528 user currently logged on found in list? If the user currently logged onto computer 14 was not found in the ordered list of users, control will fall through to results block 530 NO after which control will fall through to logic block 532 display to user: "User Logged On Not Found". Control will then fall through to return logic block 534 exit to caller "Error".

If decision logic block 528 user currently logged on found in list? determined that the user currently logged onto computer 14 was found in the ordered list of users, control will be transferred to results block 536 YES after which control will fall through to decision logic block 538 stream receiver for casting application and current user visible?

Decision logic block 538 will attempt to see if the ID for the associated stream receiver ID is visible on the wireless network. If the stream receiver ID was visible on the network, control will transfer to result block 346 YES after which control will fall through to return block 348 exit to caller, return stream receiver ID. If decision logic block 538 stream receiver for casting application and current user visible? determined that the currently associated stream receiver ID was not visible on the wireless network, control will fall through to results block 540 NO after which control will fall through to logic block 342 display to user "Stream Receiver Not Visible" after which control will fall through to return block 344 exit to caller "Error".

Figure 11:
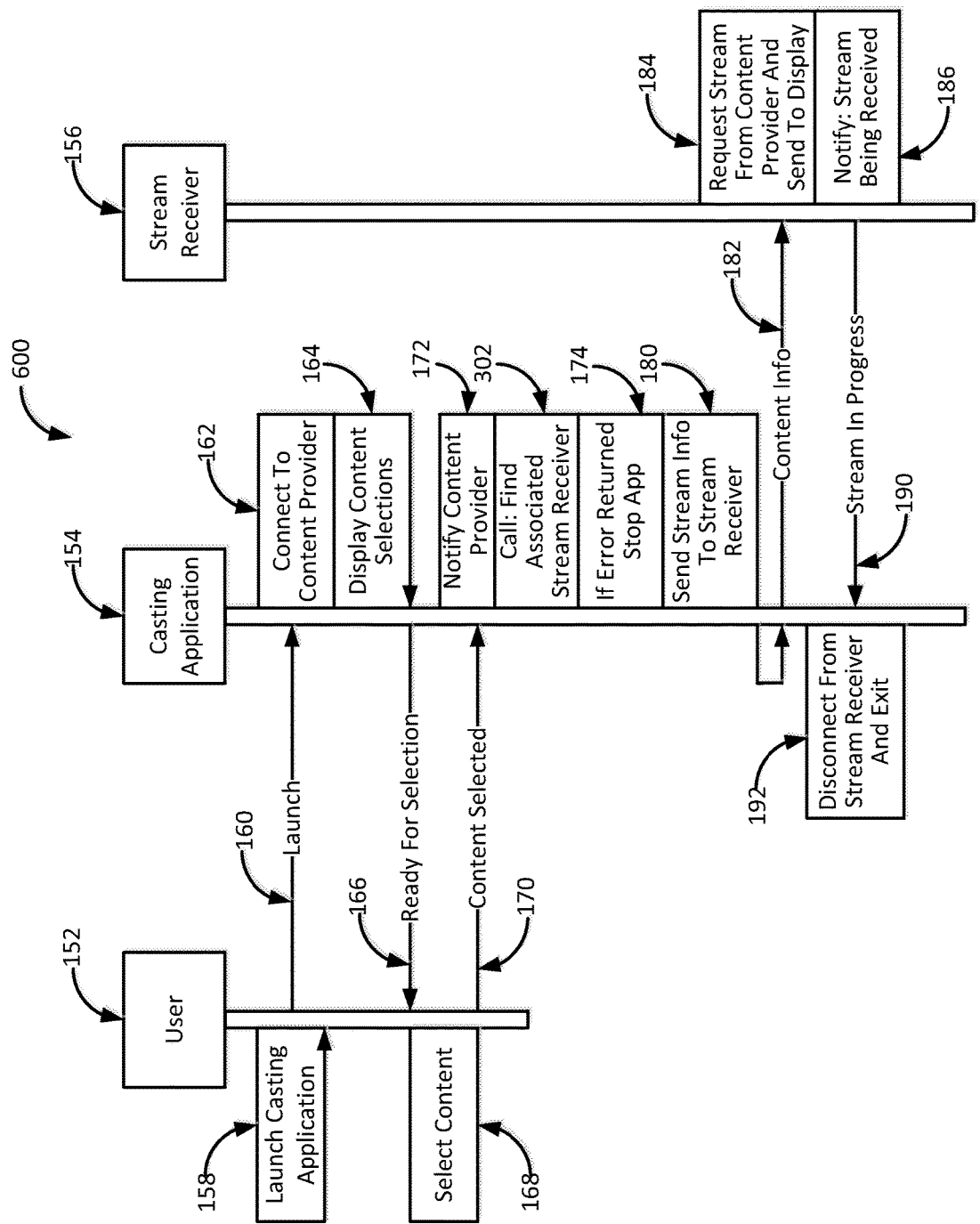
FIG. 11 is a logic flow diagram of embodiment 4 of the invention where, after a stream is cast, the casting application will disconnect from the stream receiver allowing the casting application to cast a stream to another stream receiver. In this embodiment of the invention, the casting application does not control viewing of the stream. In this embodiment of the invention, the stream receiver is associated with a remote controller that sends commands to the stream receiver to manage the stream.

Now referencing FIG. 11 where 600 is a logic flow diagram depicting embodiment 4 of the invention. This depiction is identical to the depiction of embodiment 1 described for FIG. 8 with the exception of how the stream receiver functions.

In the current embodiment, stream receiver 156 at logic block 184 requests stream from content provider and send to display. At this point stream receiver 156 will disconnect from casting application 154. Stream receiver 156 will be controlled by a hand held remote control device for managing the stream functions for play, pause, stop, reverse, and other trick play functions. In this embodiment, once stream receiver 156 at logic block 184 begins receiving the content stream control will fall through to logic block 186 notify: stream being received. Logic block 186 will send signal 190 stream in progress to logic block 192 disconnect from stream receiver and exit. This logic block completes the disconnect function and exits the application. At this point the application can be relaunched by the same or different user and another stream cast to a different stream receiver.

Those of skill would further appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The following description of terms is provided, but it should be understood that the terms used herein may also have other and/or additional meanings.

Client Device: In the context of this application, a client device is a computing device that may be location fixed such as a desktop computer or may be a mobile device such as a laptop computer, tablet computer, smart cell phone, PDA, or other such mobile device.

Streaming Content Provider: A streaming content provider is a site residing on the internet or on an intranet where streaming multimedia content files reside. The site will begin streaming a requested file and can respond to a number of different stream related requests such as play, stop, reverse.

Content Casting Application: A software application executing on a client device. The content casting application is specific to a streaming content provider. The content casting application will, once a content stream is chosen, send information for the content stream to a stream receiver. That information can be a URL for a provider, and/or login information for a website, and/or the content itself. In some instances, application software code along with the content stream URL will be cast to the chosen stream receiver. The content casting application may also have the ability to cast the same stream to multiple stream receivers.

Global Casting List: A list residing on a client device accessible by each content casting application on that client device or on another client device accessible by a wired or wireless link. The list contains the IDs of each content casting application and the IDs of stream receivers associated with each content casting application and may contain the IDs of users.

Multi Stream Casting Application: A software application executing on a client device. The multi casting application, can cast to different stream receivers, depending on who the user is at any given time. The content casting application accesses a global list located, on the client device or on another client device, where each entry contains the ID of a user and the Id of a stream receiver.

Stream Receiver: A stream receiver is a software application that may reside on a computing device connected to a display device such as a television. The stream receiver software may also reside in a display device such as a television or computer monitor.

The various illustrative logical blocks, modules, and circuits described in connection with the embodiments disclosed herein, may be controlled by a general or specific purpose processor, or with hardware that carries out these functions, e.g., a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has an internal bus connecting to cards or other hardware, running based on a system BIOS or equivalent that contains startup and boot software, system memory which provides temporary storage for an operating system, drivers for the hardware and for application programs, disk interface which provides an interface between internal storage device(s) and the other hardware, an external peripheral controller which interfaces to external devices such as a backup storage device, and a network that connects to a hard wired network cable such as Ethernet or may be a wireless connection such as a RF link running under a wireless protocol such as 802.11. Likewise, external bus 18 may be any of but not limited to hard wired external busses such as IEEE-1394 or USB. The computer system can also have a user interface port that communicates with a user interface, and which receives commands entered by a user, and a video output that produces its output via any kind of video output format, e.g., VGA, DVI, HDMI, displayport, or any other form. This may include laptop or desktop computers, and may also include portable computers, including cell phones, tablets such as the IPAD™ and Android platform tablet, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method, comprising:
   in a first computer, running a computer application that interacts with a plurality of different stream sending applications,
   each of said stream sending applications operating for sending information that commands a stream of video to one of a plurality of remote stream receivers;
   accessing, on said first computer, a global casting list associating each of said stream sending applications with one or more stream receiving devices, where at least a first stream sending application from among said plurality of different stream sending applications is associated with multiple stream receiving devices in said global casting list;
   detecting an identification of said first stream sending application, and that said first stream sending application is requesting to send to a stream receiver;
   checking said global casting list to determine an ordered list of multiple stream receiving devices which are associated with said first stream sending application,
   first attempting to connect with a first stream receiving device from said ordered list, associated with said first stream sending application and sending said information from said first stream sending application to said first stream receiving device if said first stream receiving device is available,
   if said first stream receiving device is not available, then second attempting to connect with a second stream receiving device on said ordered list, where said second stream receiving device is lower in order on said ordered list than said first stream receiving device, and sending said information from said first stream sending application to said second stream receiving device if said second stream receiving device is available, and
   subsequently checking any other stream receiving devices on said ordered list if said first and second stream receiving devices are not available, and if no streaming receiving device is available, then providing an error message on said first computer,
   but if a stream sending receiving device is available, then providing said information from said first stream sending application to an available stream receiving device;
   detecting that a second stream sending application different than said first stream sending application has been started; and
   checking said global casting list to find a second ordered list of stream receiving devices associated with said second stream sending application, and sending said information from said second stream sending application to entries on said list, where entries on the second ordered list for the second stream sending application are different than entries on the ordered list for the first stream sending application.

2. The method as in claim 1, wherein said first computer checks the first stream receiving device and determines said first stream receiving device as unavailable when either already receiving a stream or powered off.

3. The method as in claim 1, further comprising determining a user of said first computer, and where said global casting list produces the ordered list that is dependent on both a specific stream sending application that is making a request and by the user who is logged in, where different users with the same stream sending application receive a different ordered list for the same stream sending application.

4. The method as in claim 1, wherein said information is a web address and login information for a specified stream sending service.

5. The method as in claim 1, further comprising accessing said list from a second computer which is carrying out the stream sending application.

6. The method as in claim 1, wherein said list is stored on an internet-accessible location, and is accessed via the internet.

7. A computer system, comprising:
   a first computer, running a computer application that interacts with a plurality of different stream sending applications, each of said stream sending applications operating for sending information that commands a stream of video to be played by one of a plurality of remote stream receivers;
   said first computer accessing a global casting list associating each of said stream sending applications with one or more stream receiving devices, where at least a first stream sending application from among said plurality of different stream sending is associated with multiple stream receiving devices in said global casting list;

said first computer detecting an identification of said first stream sending application, and that said first stream sending application is requesting to send to a stream receiver;

said first computer checking said global casting list to determine an ordered list of multiple stream receiving devices which are associated with said first stream sending application;

said first computer first attempting to connect with a first stream receiving device from said ordered list, associated with said first stream sending application and sending said information from said first stream sending application to said first stream receiving device if said first stream receiving device is available, if said first stream receiving device is not available, then said first computer second attempting to connect with a second stream receiving device on said ordered list, where said second stream receiving device is lower in order on said ordered list than said first stream receiving device, and sending said information from said first stream sending application to said second stream receiving device if said second stream receiving device is available;

if neither said first stream receiving device nor said second stream receiving device are available, then said first computer subsequently checking any other stream receiving devices on said ordered list and if no streaming receiving device is available, then providing an error message on said first computer;

if a stream sending receiving device is available, then said first computer providing said information from said stream sending application to an available stream receiving device;

said first computer detecting that a second stream sending application different than said first stream sending application has been started; and said first computer checking said global casting list to find a second ordered list of stream receiving devices associated with said second stream sending application, and sending said information from said second stream sending application to entries on said second ordered list, where entries on the second ordered list for the second stream sending application are different than entries on the ordered list for the first stream sending application.

8. The system as in claim 7, wherein said first computer checks the first stream receiving device and determines said first stream receiving device as unavailable when either already receiving a stream or powered off.

9. The system as in claim 7, wherein the first computer determines a user who is logged on, and where said global casting list produces the ordered list that is dependent on both a specific stream sending application that is making a request and by the user who is logged in, where different users with the same stream sending application receive a different ordered list for the same stream sending application.

10. The system as in claim 7, wherein said information is a web address and login information for a specified stream sending service.

11. The system as in claim 7, said list is accessed over the internet.

12. The system as in claim 7, said list is also accessible from a second computer which is carrying out the stream sending application.

* * * * *